United States Patent
Su Sun

[11] Patent Number: 5,198,953
[45] Date of Patent: Mar. 30, 1993

[54] DEVICE WHICH OPENS AND CLOSES THE HUB LOCKER OF A DIGITAL AUDIO TAPE CARTRIDGE

[75] Inventor: Ryu Su Sun, Chungnam, Rep. of Korea

[73] Assignee: SKC Limited, Rep. of Korea

[21] Appl. No.: 631,635

[22] Filed: Dec. 21, 1990

[30] Foreign Application Priority Data

Dec. 21, 1989 [KR] Rep. of Korea ............... 89-19448

[51] Int. Cl.[5] ............... G11B 23/087; G11B 15/32; G11B 15/22
[52] U.S. Cl. ............... 360/132; 242/198; 242/199
[58] Field of Search ............... 360/132; 242/199, 198

[56] References Cited

U.S. PATENT DOCUMENTS

| | | |
|---|---|---|
| 4,572,461 | 2/1986 | Horikawa et al. ............ 360/132 X |
| 4,576,345 | 3/1986 | Koken et al. ............ 360/132 X |
| 4,635,879 | 1/1987 | Sumida et al. ............ 360/132 X |
| 4,660,784 | 4/1987 | Sumida et al. ............ 360/132 X |
| 4,678,138 | 7/1987 | Nemoto ............ 360/132 X |
| 4,789,113 | 12/1988 | Katagiri et al. ............ 360/132 X |
| 4,824,044 | 4/1989 | Oogi ............ 242/198 |

Primary Examiner—Stuart S. Levy
Assistant Examiner—Craig A. Renner
Attorney, Agent, or Firm—Quarles & Brady

[57] ABSTRACT

An improved digital audio tape cartridge has a pivotal lid with sidewalls formed to provide grooves which positively engage the jaws of wings of a tape reel hub locker so that the locked tape reel can be reliably released when the lid of the digital audio tape cartridge opens.

1 Claim, 4 Drawing Sheets

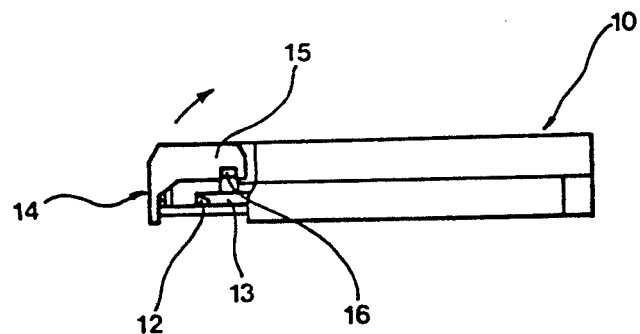
FIG. 2A
FIG. 2B
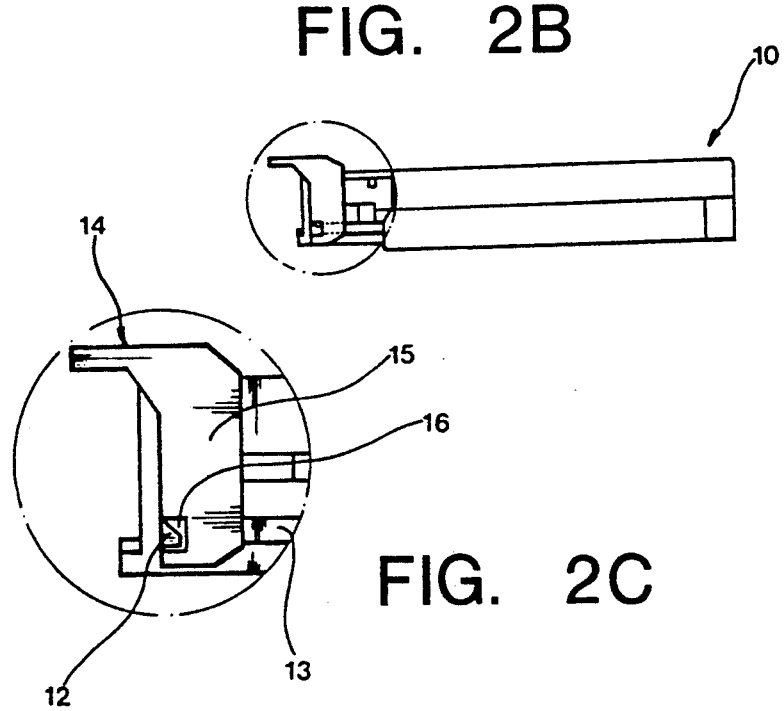
FIG. 2C

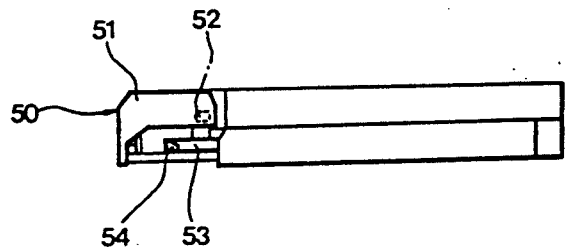
FIG. 4A Prior Art
FIG. 4B Prior Art
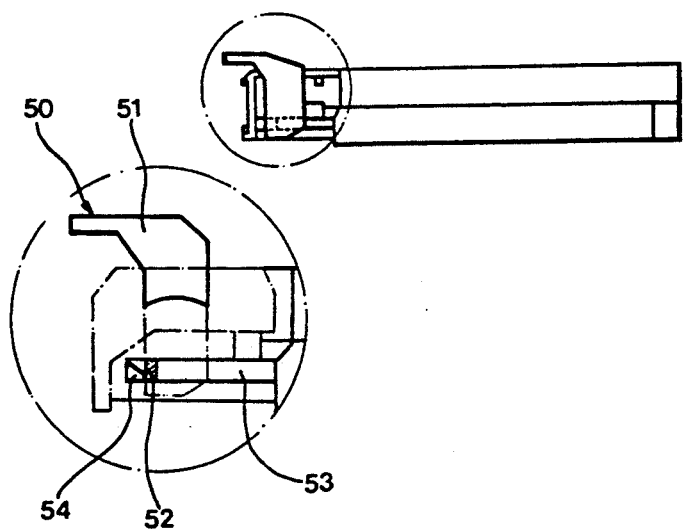
FIG. 4C Prior Art

DEVICE WHICH OPENS AND CLOSES THE HUB LOCKER OF A DIGITAL AUDIO TAPE CARTRIDGE

FIELD OF THE INVENTION

The present invention relates to a device for controlling the hub locker of a digital audio tape cartridge. More particularly, the invention relates to an improved device for reliably controlling the hub locker of a digital audio tape cartridge by providing grooves in sidewalls of a tape cartridge lid to positively engage a jaw member of the hub locker.

BACKGROUND OF THE INVENTION

It is generally known that a magnetic tape cartridge is used to prevent dust from accumulating on the enclosed tape and can be generally equipped with tape reel locking means constructed to prevent the tape from unwinding off the tape reel when not in use. A tape cartridge can also provide a pivotal lid which is open to expose the tape during use and closed to protect the tape when not in use.

One known type of tape reel locking means comprises a hub locker which retractably engages saw teeth on the perimeter of the tape reel hub and is resiliently urged to engage the saw teeth by spring means connected to the interior of the upper shell of the tape cartridge. When it is desired to rotate a tape reel during play of the audio tape, the hub locker is retracted from the saw teeth. When the tape reel is not in use, the hub locker is urged into engagement with the saw teeth by the spring means, thereby preventing rotation of the tape reel and corresponding unwinding of the tape.

A hub locker generally provides extended wings which are disposed proximate sidewalls of the tape cartridge lid. When the lid is opened, structure of the lid sidewalls engages the hub locker wings, thereby pulling the hub locker out of engagement with the tape reel hub.

Referring to FIG. 3, which shows an embodiment of a typical prior art cartridge, a projection 52 is formed on the interior of each sidewall 51 of the cartridge lid 50. When the lid is open, each projection 52 pulls a hub locker wing 53 by engaging a jaw 54 of the hub locker wing 53.

Referring to FIGS. 4A and 4B, the jaw 54 and hub locker wing 53 are urged forward. This forward movement disengages the hub locker from the saw teeth of the tape reel hub.

One disadvantage of this known configuration is that the projection 52 is not reliably engaged by the jaw 54. The hub locker wing 53 can be become bent after repeated movement by the projection 52, thereby causing separation of the jaw 54 and projection 52. As a result, the hub locker is not pulled adequately, and the locked tape reel is not released during play of the tape.

SUMMARY OF THE INVENTION

Accordingly, an object of the present invention is to provide a device which reliably controls the hub locker of a digital audio tape cartridge so that the locked tape reel is released when the lid of the digital audio tape cartridge is open. This object is achieved by the present invention which provides an engagement groove in each of the sidewalls of the cartridge lid for positively engaging the jaws of the hub locker wings.

BRIEF DESCRIPTION OF THE DRAWINGS

FIGS. 2A and 2B are side views of a digital audio tape cartridge illustrating the operation of the present invention.

FIG. 2C is an enlarged view of the section encircled in FIG. 2B.

FIGS. 4A and 4B are side views illustrating the operation of the prior art embodiment in FIG. 3.

FIG. 4C is an enlarged view of the encircled section in FIG. 4B.

DETAILED DESCRIPTION OF THE PREFERRED EMBODIMENT

Figure 1:
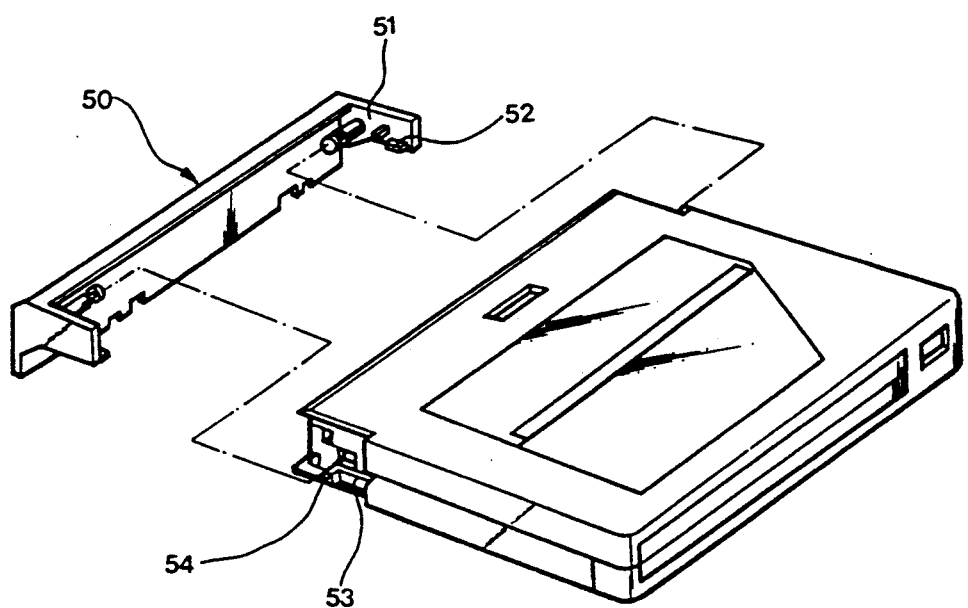
FIG. 1 is an exploded perspective view of a digital audio tape cartridge showing the engagement groove of the present invention.
Figure 3:
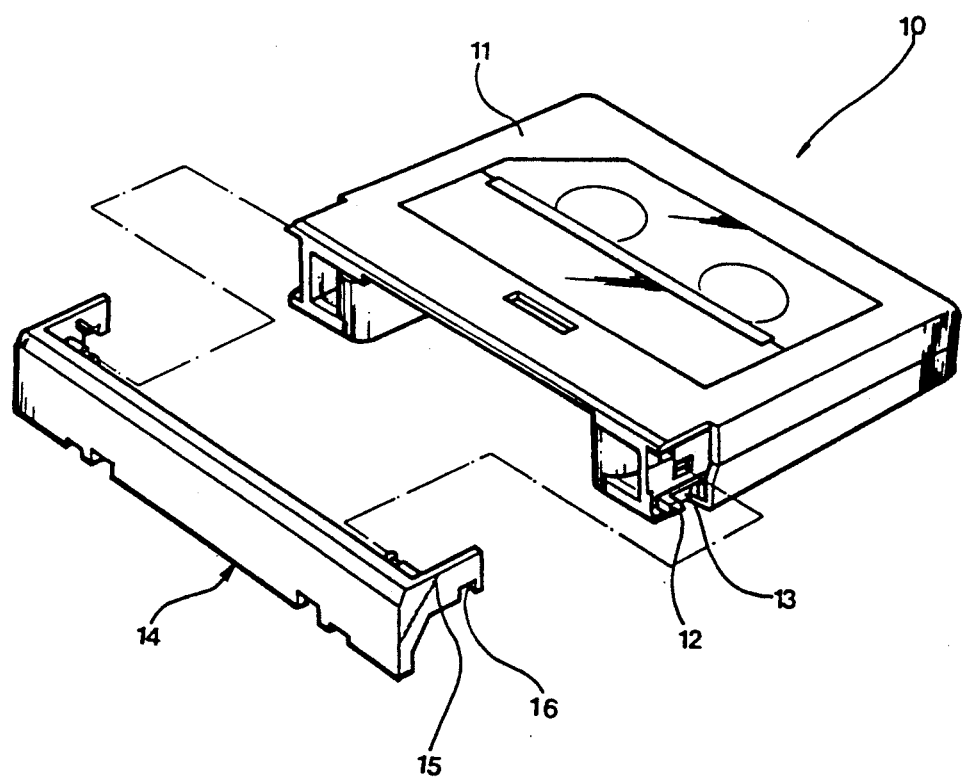
FIG. 3 is an exploded perspective view of a prior art embodiment of a digital audio tape cartridge.

Referring to FIG. 1, the present invention is directed to an improvement in the structure of a digital audio tape cartridge 10. As is generally known to a person of ordinary skill in the art, a digital audio tape cartridge 10 typically comprises a housing including an upper shell 11. The housing of the digital audio tape cartridge 10 has a front side across which the tape is exposed during play in a digital audio tape player. To protect the exposed tape from damage, due to dust and the like, the front side of the digital audio tape cartridge 10 is covered by a pivotal lid 14. The lid 14 is rotatable between a closed position, covering the tape, and an open position, exposing the tape.

Within the digital audio tape cartridge 10, the tape is wound around a pair of tape reels. The tape reel hubs can provide a series of saw teeth along their perimeters for locking engagement with a hub locker. The hub locker can be resiliently urged into engagement with the tape reel saw teeth by spring means attached to the upper shell 11.

The hub locker can be constructed to provide a pair of hub locker wings 13 which extends from the interior of the audio tape cartridge 10 to the front side of the digital audio tape cartridge 10. The wings 13 are disposed on opposite ends of the front side of the digital audio tape cartridge 10. Each wing 13 can provide a jaw 12 which extends transversely to the front surface of the digital audio tape cartridge 10.

Referring to FIGS. 2A and 2B, according to the present invention, the sidewalls 15 of the lid 14 are formed to provide grooves 16. When the lid 14 is rotated into an open position, the seat of each groove 16 engages the corresponding jaw 12 and urges the hub locker wings 13 toward the front surface of the digital audio tape cartridge 10. This forward movement of the hub locker wings 13 disengages the hub locker from the saw teeth of the tape reel, thereby permitting rotation of the tape reel.

Accordingly, the present invention provides an improved digital audio tape cartridge which is capable of reliably releasing the locked tape reels by providing grooves in the sidewalls of the cartridge lid for positive engagement with the wings of a hub locker. As the foregoing description is intended to illustrate the preferred embodiments of the present invention, the scope of the present invention should not be limited by this description but only by a reasonable interpretation of the appended claim.

I claim:

1. A digital audio tape cartridge lid for use on a digital audio tape cartridge wherein a wing having a jaw at a front end of said wing is formed on each of opposite sides of a hub locker which is retractably urged by a spring attached to said cartridge into engagement with saw teeth on a perimeter of at least one of two tape reels disposed in said cartridge, comprising:

a pair of sidewalls pivotally connected to said audio tape cartridge proximate said jaws, said sidewalls having back edges which face rearwardly when the lid is closed over a front of the audio tape cartridge, said sidewalls being formed to provide grooves extending through said sidewalls, from sides of the sidewalls facing the audio tape cartridge, said grooves having openings in the direction of engagement with said jaws, said grooves being defined by groove walls spaced from the back edges, at least portions of said jaws being inserted into said grooves respectively and urged when said lid is rotated into an open position, whereby said hub locker is disengaged from said saw teeth when said jaws are urged.

* * * * *